C. F. BETZ.
PASTRY FEEDING MECHANISM FOR PASTRY CONE MACHINES.
APPLICATION FILED JULY 10, 1919.

1,347,073.

Patented July 20, 1920.

Inventor:
CHARLES F. BETZ,
By John H. Bruninga
His Attorney.

UNITED STATES PATENT OFFICE.

CHARLES F. BETZ, OF ST. LOUIS, MISSOURI.

PASTRY-FEEDING MECHANISM FOR PASTRY-CONE MACHINES.

1,347,073. Specification of Letters Patent. Patented July 20, 1920.

Application filed July 10, 1919. Serial No. 309,852.

*To all whom it may concern:*

Be it known that I, CHARLES F. BETZ, a citizen of the United States, and residing at St. Louis, Missouri, have invented the new and useful Improvement in Pastry-Feeding Mechanism for Pastry-Cone Machines, of which the following is a specification.

This invention relates to pastry or batter feeding mechanism, and more particularly to mechanism adapted to feed pastry or batter to the baking devices or molds of a baking machine, such as a pastry cone machine.

In the manufacture of baked products, such as pastry cones, the machine comprises a traveling frame having a series of molds thereon with which coöperates a series of cores. The pastry or batter is supplied to the molds by means of a suitable feeding mechanism, while the cores are separated from and clear of the molds and the cores then enter the molds and press the batter or pastry to shape and pass into an oven where the molds and the batter therein are heated to bake the latter and form the baked product or article; the mold is then opened by separating the cores therefrom and the baked product is withdrawn.

In such a machine, the molds and cores should be heated and remain heated uniformly; in view of the fact however, that the molds must pass close to and underneath the batter outlets of the feeding mechanism, this mechanism is subjected to the radiant and convective heat from the molds; the result is, therefore, that the batter is liable to coagulate to some extent, stopping the outlets and clogging the entire mechanism so that the operation of the machine is not only interfered with but may be interrupted altogether. This is particularly disadvantageous in a machine for making pastry cones for in such a machine the batter must be measured with accuracy, especially in view of the small amount of batter really contained in a pastry cone.

One of the objects of this invention, therefore, is to provide mechanism whereby the batter may be fed accurately to the baking device and whereby the feeding mechanism is so constructed and arranged and has such provisions as to insure the reliable operation thereof.

Further objects will appear from the detail description taken in connection with the accompanying drawing in which—

Figure 1:
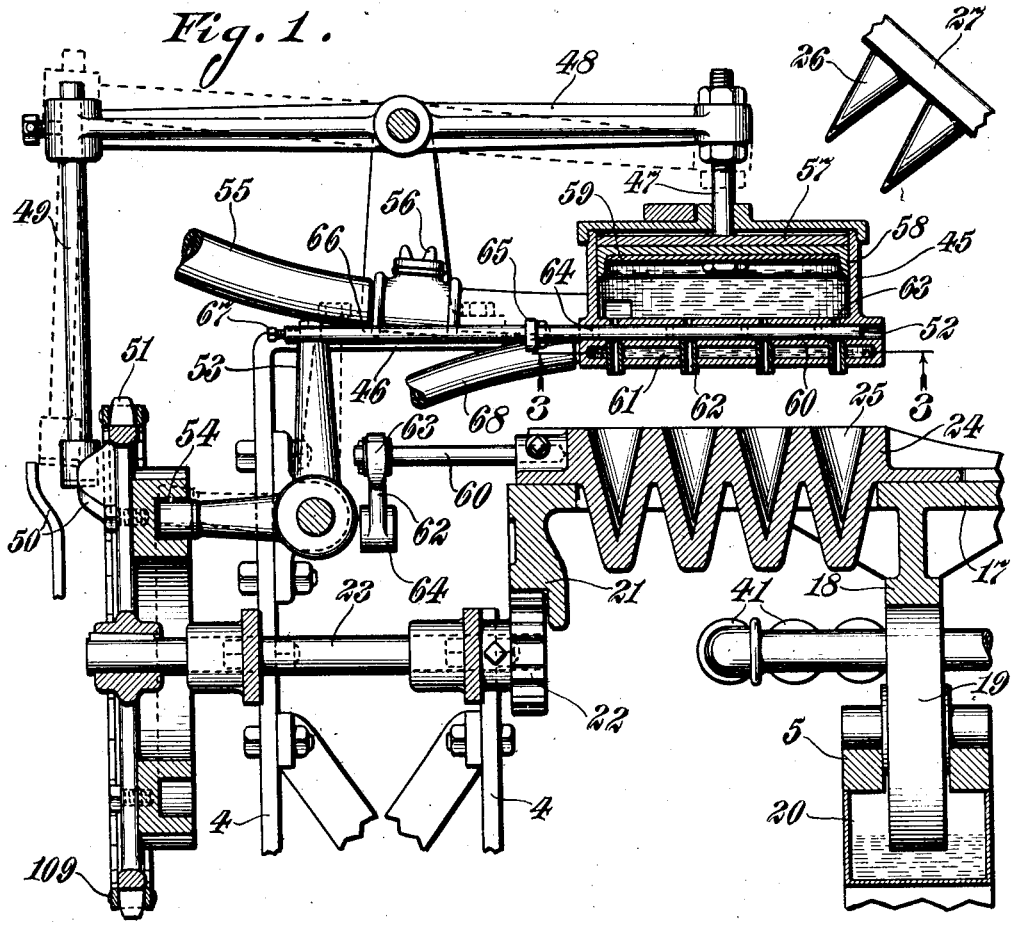
Figure 1 is a vertical section of a part of a pastry cone machine and showing the pastry or batter feeding mechanism embodying this invention.
Figure 2:
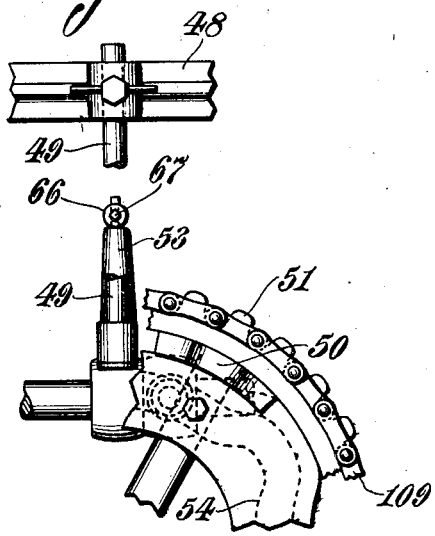
Fig. 2 is a detail side elevation showing the operating cam.
Figure 3:
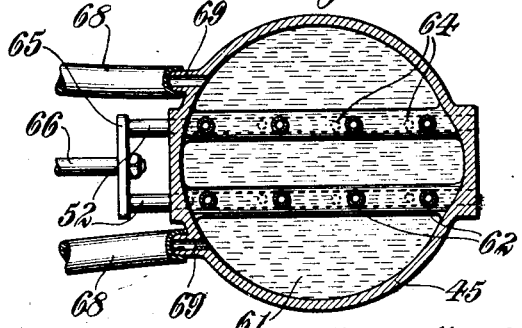
Fig. 3 is a section on the line 3—3, Fig. 1.

Referring to the accompanying drawing, 4 and 5 designate standards or supports and 17 designates a traveling frame showing a track 18 resting on a series of rolls 19 mounted in the standards 5. The traveling frame 17 has a toothed flange 21 coöperating with a pinion 22 on a shaft 23 mounted in the standard 4 so as to impart a rotary movement to the traveling frame 17. The traveling frame has mounted thereon a series of baking devices comprising sets of molds and cores, the molds 24 having cone shaped mold cavities 25 which coöperate with cores 26 mounted on core supports 27 in turn pivotally mounted on the traveling frame so as to be movable into and out of the molds. A series of heating pipes 41 mounted on standard 5 apply flames to the bottom of the molds traveling thereover and there is a series of heating pipes applying flame to the upper faces of the core supports when the cores are in position in the molds. This mechanism is fully shown and described in application Serial Number 309,851 filed of even date herewith.

A batter receptacle 45 is mounted on an overhanging bracket 46 on the standard 4 so as to place the batter receptacle over the molds in the traveling frame. Batter is fed to this receptacle or cylinder by a conduit 55 from an overhead tank (not shown) so as to supply batter to the receptacle by gravity and a valve 56 is provided to cut off the supply of batter.

A piston 57 travels in the cylinder or receptacle 45 and this piston is mounted on a piston rod 47 adjustably mounted on one end of a lever 48 pivoted intermediate its ends on the bracket 46 and having its other end adjustably connected with a rod 49 having at its free end a cam roll engaging a cam 50 on a sprocket 51 driven by a chain 109 from the main drive shaft as described in from the application referred to. The piston has a cup packing 58 of leather or other suitable material which is clamped between the piston body and a plate 59.

The batter receptacle 45 has a partition 50 which is formed to make guides for a pair of valve stems 52 and below this partition which forms a false bottom is a space 61. Passing through this space 61 is a series of perforated nipples 62 which are screwed into the valve guides, and the partition above the valves is perforated at 63 to aline with the perforations in the nipples. The valves are provided with perforations 64 adapted to aline the perforations 63 with the nipples when the valves are open. The valve stems 52 are connected by a cross-head 65 in turn connected with a shank 66 which is slotted at its end and takes over the end of one arm of a bell crank lever 53, the other arm of which has a cam roll engaging a cam 54 on the sprocket 51. A set screw 67 is provided to furnish a proper bearing between the shank 66 and the bell crank lever 53.

The space 61 which forms a water jacket has below the outlet valve, connections 68 which may be flexible connections taking over nipples 69 on the receptacle body and connecting with the water jacket.

During the operation of the machine the sprocket 51 being connected to the pinion 22 is operated in timed relation so that the feeding mechanism and the traveling frame will be operated in timed relation. Assuming that a set of molds is opposite the feeding mechanism so that the mold cavities 25 in a set will be opposite the nipples 62 and that the cores 26 are at this time out of the mold as shown in Fig. 1, the cam 54 will through the bell crank and shank connections heretofore described move the valve stems 52 to the right (Fig. 1) so as to aline the perforations 63 and the nipples in order to connect the outlet nipples 62 with the interior of the receptacle. As this is done the cam 50 will through the shank and lever connections heretofore described move the piston down a predetermined amount thereby forcing predetermined quantities of batter through the valves and into the mold cavities; the valve stems 52 are then again moved to the right thereby cutting off the outlets; the piston will then again be moved up, thereby drawing another quantity of batter from the supply tank through the pipe 55. This operation is repeated whenever a set of molds comes underneath the batter feeding mechanism.

It will be seen that when a set of molds is underneath the batter feeding mechanism, the batter feeding mechanism including its outlets, the valves, the batter receptacle and the piston therein are subject to the radiant and convective heat from the hot molds. This would impair the operation of the mechanism as heretofore described if the water jacket were not provided. The provision of the water jacket, however, effectively protects the mechanism as the circulation of the cooling water in the cooling jacket shields the entire mechanism against the heat from the molds so that no coagulation will take place and the operation is not impaired. Accordingly, it is not only possible to use simple feeding mechanism but it is also possible to use a simple cup packing on the piston; all of which is of great advantage in the handling of a peculiarly obstinate material such as batter in a hot machine.

It is obvious that various changes may be made in the details of construction without departing from the spirit of this invention; it is, therefore, to be understood that this invention is not to be limited to the specific construction shown and described.

Having thus described the invention, what is claimed is:

1. In a pastry baking machine, batter feeding means, and a cooling jacket therefor.

2. In a pastry baking machine, batter feeding means comprising a batter receptacle and a cooling jacket therefor.

3. In a pastry baking machine, batter feeding means comprising a batter receptacle, a batter outlet therefor, and a cooling jacket for said outlet.

4. In a pastry baking machine, batter feeding means comprising a batter receptacle, a series of batter outlets leading therefrom, and a cooling jacket for said outlets.

5. In a pastry baking machine, batter feeding means comprising a batter receptacle, means for controlling the discharge of batter from said receptacle and a cooling jacket therefor.

6. In a pastry baking machine, batter feeding means comprising a batter receptacle, means for ejecting batter therefrom, and a cooling jacket therefor.

7. In a pastry baking machine, batter feeding means comprising a batter receptacle, a piston operating therein, and a cooling jacket therefor.

8. In a pastry baking machine, batter feeding means comprising a batter receptacle, a piston operating therein, means for controlling the discharge of batter from said receptacle, and a cooling jacket therefor.

9. A pastry baking machine having a baking device and means for feeding batter to said device, characterized by the provision of a cooling jacket for said batter feeding means.

10. A pastry baking machine having a baking device and means for feeding batter to said device, characterized by the provision of a cooling jacket positioned to shield said batter feeding means against the heat from the baking device.

11. A pastry baking machine having a baking device and means for feeding batter to said device, characterized by the provision of a cooling jacket for and at the face of said batter feeding means adjacent the baking device.

12. A pastry making machine having a movable baking device and a batter receptacle adapted to deliver batter to said device, characterized by the provision of a cooling jacket for said receptacle.

13. A pastry baking machine having a movable baking device and a batter feeding receptacle having means for feeding batter to said device, characterized by the provision of a cooling jacket for said feeding means.

In testimony whereof I affix my signature.

CHAS. F. BETZ.